United States Patent [19]

Smolders et al.

[11] Patent Number: 4,908,235

[45] Date of Patent: Mar. 13, 1990

[54] PROCESS FOR THE PRODUCTION OF A BILAYER MEMBRANE

[75] Inventors: Cornelius A. Smolders, Hengelo; Antonius C. M. Franken; Marcellinus H. V. Mulder, both of Enschede, all of Netherlands

[73] Assignee: Akzo NV, Netherlands

[21] Appl. No.: 164,911

[22] Filed: Mar. 7, 1988

[30] Foreign Application Priority Data

Mar. 5, 1987 [DE] Fed. Rep. of Germany ....... 3707054

[51] Int. Cl.$^4$ ............................................. B05D 5/00
[52] U.S. Cl. ................................... 427/243; 427/244; 427/296; 427/377; 427/378
[58] Field of Search ............ 427/296, 244, 243, 378, 427/377; 264/45.1

[56] References Cited

U.S. PATENT DOCUMENTS

| | | | |
|---|---|---|---|
| 3,846,404 | 11/1974 | Nichols | 260/230 |
| 3,950,255 | 4/1976 | Ishii et al. | 210/490 |
| 4,042,733 | 8/1977 | Buchta et al. | 427/391 |
| 4,247,498 | 1/1981 | Castro | 264/41 |
| 4,307,195 | 12/1981 | Karasawa et al. | 435/288 |
| 4,434,250 | 2/1984 | Kessler | 521/64 |
| 4,519,909 | 5/1985 | Castro | 210/500 |
| 4,564,488 | 1/1986 | Gerlach et al. | 264/41 |
| 4,594,207 | 6/1986 | Josefiak et al. | 264/41 |
| 4,737,325 | 4/1988 | Kamiyama et al. | 264/45.1 |
| 4,751,104 | 6/1988 | Kulprathipanja | 427/244 |

FOREIGN PATENT DOCUMENTS

| | | |
|---|---|---|
| 1267167 | 3/1972 | United Kingdom . |
| 1398081 | 6/1975 | United Kingdom . |
| 2035133 | 6/1980 | United Kingdom . |

OTHER PUBLICATIONS

Patents Abstracts of Japan, C-316, Nov. 28, 1985, vol. 9, No. 301, 60-141733 (A).
Patents Abstracts of Japan, C-182, Aug. 20, 1983, vol. 7, No. 191, 58-91733 (A).
Patents Abstracts of Japan, C-236, Aug. 3, 1984, vol. 8, No. 168, 59-68342 (A).

*Primary Examiner*—Janyce Bell
*Attorney, Agent, or Firm*—Oliff & Berridge

[57] ABSTRACT

Process for the production of a bilayer membrane consisting of a selectively acting nonporous polymer membrane first layer and a microporous membrane second layer, in which a polymer solution intended for the formation of the first layer is brought into contact with one side of the second layer. A larger amount of polymer solution than is necessary for the formation of the first layer is used, and a portion of the solvent is caused to volatilize through the pores of the second layer. The polymer solution is not caused to enter the pores of the second layer. After the first layer has attained the desired thickness, the excess polymer solution is removed. The first layer may be subjected to a drying and/or cross-linking treatment.

11 Claims, 1 Drawing Sheet

PROCESS FOR THE PRODUCTION OF A BILAYER MEMBRANE

TECHNICAL FIELD

The invention relates to a process for the production of a bilayer membrane, which comprises a selectively acting nonporous polymer membrane first layer and a microporous membrane second layer, in which a polymer solution intended for the formation of the first layer and comprising at least one polymer and a solvent for the polymer is brought into contact with one side of the second layer and the solvent is caused to volatilize.

A membrane layer is described as selectively acting when it is variably permeable to the components of a liquid, vapor, or gas mixture, especially to one component, and consequently produces a shift in the partial vapor pressure equilibrium in a liquid mixture.

Nonporous membrane layers are frequently described as pore-free, impermeable, or homogeneous.

Processes for the production of a bilayer membrane of the above-mentioned type are known. Such processes, which cannot be effected in ready-made devices, have a considerable disadvantage in that the very thin and therefore very delicate first layer, by necessity applied beforehand to the second layer, can be easily damaged in further processing of the bilayer membranes. This disadvantage can be eliminated by the novel process in that it is executed only after the microporous second layer is already completely built into a unit.

An object of the present invention is the provision of a process which produces bilayer membranes with improved properties and which are especially suitable for execution in readymade devices for material separation or mass and/or heat transfer.

BRIEF SUMMARY OF THE INVENTION

The present invention relates to a process for the production of a bilayer membrane comprising a selectively acting nonporous polymer membrane first layer and a microporous membrane second layer comprising contacting an excess amount of a polymer solution with one surface of the microporous membrane second layer, the polymer solution comprising at least one polymer and a solvent for the polymer; volatilizing a portion of the solvent through the pores of the microporous layer as a vapor and without the polymer solution entering the pores, thereby forming the selectively acting nonporous polymer membrane layer on the surface of the microporous membrane second layer; and removing the excess polymer solution after the desired thickness of the selectively acting non-porous polymer membrane layer is achieved.

DETAILED DESCRIPTION OF PREFERRED EMBODIMENTS OF THE INVENTION

Figure 1:
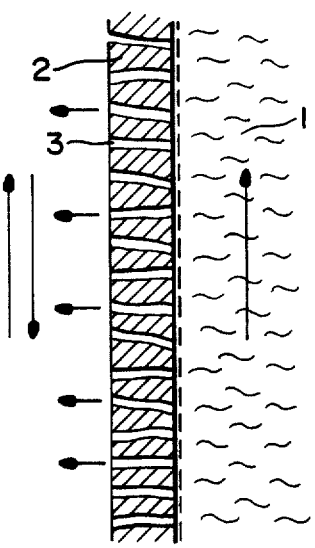
FIG. 1 shows the major features of the novel process in a simplified schematic drawing.

As summarized above, objects of the present invention are achieved by a process of the above-mentioned type in that a greater amount of polymer solution than necessary to form the first layer is used, in that the volatilizing of the solvent is effected by lowering the solvent's partial vapor pressure on the other side of the second layer and thus occurs through the pores of the second layer, in that the lowering of the solvent's partial vapor pressure occurs in such a way that the polymer solution is not caused to enter the pores of the second layer, in that only a portion of the polymer solution solvent is caused to volatilize, in that excess polymer solution is removed after the first layer attains the desired thickness, and in that the first layer is afterwards subjected to a drying and/or cross-linking process.

An important feature of the novel process is that the solvent reaches the other side as a vapor, thus not in liquid form, through the pores of the second layer. It is thereby possible to fabricate a bilayer membrane also of porous layers, the pores of which are larger than the macromolecules of the polymer employed for the first layer. On the other hand, one cannot preclude that there are bilayer membranes that—limited by the previously noted process feature—cannot be fabricated by the novel process, because entry of the liquid solvent for the polymer solution into pores of the second layer cannot be prevented.

The novel process can be executed particularly easily if the second layer is formed in the shape of at least one hollow filament or a tube, whereby the second, nonporous, layer can be formed according to the novel process on the exterior or interior of the porous membranes shaped like hollow filaments or tubes.

The novel process thus opens up the possibility of transforming devices designed for mass transfer or material separation by means of microporous membrane layers into devices suitable for pervaporation. A greater flexibility is achieved in this manner in using the very same basic form of this type of device.

Cellulose acetate, polysulfone, polyvinyl alcohol, or polyacrylonitrile can be used to form the first layer.

Dimethylsulfoxide (DMSO) or water are suitable as solvents. The polymer concentration in the polymer solution is preferably in the range of 1–7.5 weight precent. In this case, one must consider that polymer solution viscosity increases appreciably with increasing weight percentages of the polymer in the solution. When water is the solvent for the polymer solution, the second layer is to possess hydrophobic properties at least on the surface to be acted upon by the polymer solution. In this case, it is then possible to use a microporous second layer having a maximum pore size of about 1 um.

Microporous membrane layers are employed as the second layer preferably but not exclusively, as disclosed in West German Patent No. (DE-PS) 27 37 745, Unexamined West German Patent Application No. (DE-OS) 28 33 493, Unexamined West German Patent Application No. (DE-OS) 28 33 623, Unexamined West German Patent Application (DE-OS) No. 30 49 557, and West German Patent No. (DE-PS) 32 05 289. Another material suitable for the second layer is PVDF (poly(vinylidene fluoride)).

If a material which is not wetted by the polymer solution solvent is used for the second layer, then it can also be advantageous to make the surface to be coated of the second layer, but not the interior of the pores, wettable. Suitable processes for raising the surface tension of solid materials are known per se. For example, a suitable process for polypropylene or polyester is sulfonation with fuming sulfuric acid, for example, a solution of 3% $SO_3$ in sulfuric acid.

The lowering of solvent partial vapor pressure on the uncoated side of the second layer can be achieved by creating low pressure or by passing by a carrier gas such as nitrogen. If vacuum is used it should not be set so high that the polymer solution is sucked into the pores. The carrier gas method is indicated for this reason for instances where this already occurs at a low partial vacuum.

The drying and cross-linking of polyvinyl alcohol layers are carried out in the range of 100° to 150° C., whereby the treatment time is in the range of 30 to 120 minutes. Thermal damage to the layer can occur depending on the duration of the thermal treatment. The cross-linking of the first layer can be effected also by a chemical treatment. The cross-linking of a polyvinyl alcohol layer in a chemical manner can be achieved with dialdehydes, diketones, dicarboxylic acids, and the like. In this instance as well, cross-linking is preferably carried out at temperatures greater than room temperature. A treatment duration of 30 minutes at 130° C. proves to be useful here as well.

During drying and cross-linking, a stream of gas can also be passed along the first layer. The gas should be passed through the hollow filaments or tubes in the case of internal coating.

Good results for the first layer are achieved with polyvinyl alcohol with a molecular weight of 72,000, 76,000, 95,000, or 126,000, whereby the degree of saponification is in the range of 96 to 98%. In some cases, 0.05 moles of maleic acid per mole of monomeric polyvinyl alcohol are mixed into the polymer solution. Maleic acid acts as a cross-linking agent, so that the cross-linking can be carried out at rather low temperatures.

If the novel process is carried out with a device in which the microporous membrane second layer comprises hollow filaments or tubes, then the polymer solution can be passed through the hollow filaments or tubes with a flow rate in the range of 1 to 350 mm/s, while solvent volatilization is effected concurrently via the pores of the second layer. It can be determined beforehand by simple experiments which layer thickness the first layer reaches under what conditions and within what time period. When the desired layer thickness is achieved, then the excess polymer solution can be removed from the hollow filaments or tubes by permitting it to flow out. The polymer layer remaining on the inside of the hollow filaments or tubes is dried and subjected to a chemical or thermal cross-linking treatment. In so doing, a uniform first layer thickness is achieved when during the drying and cross-linking the device is rotated around the longitudinal axis which is substantially parallel to the hollow filaments or tubes, for example, at a speed of 5 rotations per minute.

At a flow rate of 4 mm/s, a polyvinyl alcohol layer can be fabricated with a thickness in the range of 5 to 80 um. In contrast, a flow rate of 35 mm/s produces a membrane having a layer thickness of less than 0.5 um.

The time for the formation of the first layer was varied in experiments in the range of 30 minutes to 15 hours. In so doing, it was determined that the final layer thickness is achieved approximately as early as after 30 minutes. As a rule, 2 hours should therefore be regarded as sufficient.

It is also possible, however, to apply the first layer to the outside of the hollow filaments or tubes.

It is likewise possible to execute the novel process two or more times in succession on the same side of the second layer.

The surface of the microporous membrane second layer to be provided with the first layer should not have a too high roughness, because this makes formation of a closed, i.e., defect-free, nonporous first layer difficult.

FIG. 1 shows the embodiment of the process in which the polymer solution 1 for the formation of the first, nonporous, layer is caused to flow along the microporous membrane second layer 2. The solvent is volatilized through the pores 3 in the second layer 2, by passing a carrier gas stream in a parallel current or countercurrent along the other side, not exposed to the polymer solution, of the second layer 2, or by establishing low pressure vacuum on the opposite side of the second layer.

Figure 2:
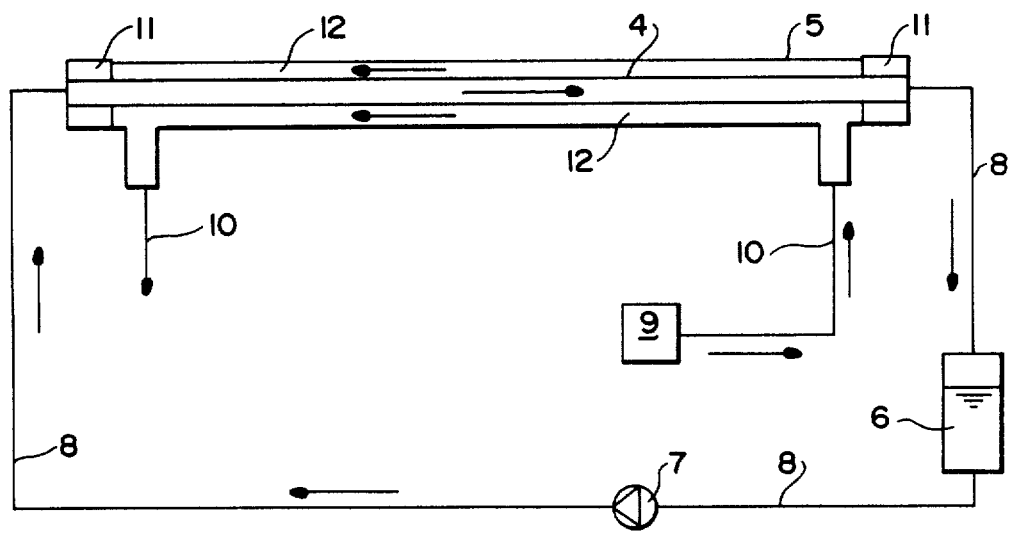
FIG. 2 illustrates an experimental setup for coating the inside of a porous hollow filament.

The setup in FIG. 2 has the following components: the porous hollow filament second layer 4 to be provided with the first layer on its interior surface, the housing 5 by which the ends of the hollow filament 4 are connected fluid-tight by pouring in curable casting material 11, the storage vessel 6 for the polymer solution, pump 7, and the pipes 8 for recirculating the polymer solution, a nitrogen storage vessel 9, and pipes for conducting the nitrogen 10. To apply the first layer to the inside of the hollow filament 4, the polymer solution is pumped with pump 7 through the interior or lumen of hollow filament 4 and recirculated by pumping for a desired time period. At the same time, nitrogen is passed along the outside of hollow filament 4, whereby volatization of the polymer solution solvent is achieved through the pores of hollow filament 4 into the space 12, surrounding hollow filament 4 and filled with nitrogen, of the housing 5. The solvent is removed from housing 5. The subsequent process steps, not shown and further described herein, proceed approximately as described above.

It is clear from the example in FIG. 2 that it is possible with the novel process to provide a multitude of porous hollow filaments or tubes, which are gathered into a bundle or arranged in a common housing, concurrently with a nonporous first layer in a simple manner.

EXAMPLES

Experiments with good results were performed using the following hollow filaments as the microporous membrane second layer:

| Polymer | PVDF | PVDF | PP |
| --- | --- | --- | --- |
| Inside diameter (um) | 830 | 1000 | 1200 |
| Outside diameter (um) | 1230 | 1500 | 1800 |
| Wall thickness (um) | 200 | 250 | 300 |
| Largest pore diameter (um) | 0.25 | 0.6 | 0.38 |
| Porosity/pore volume (%) | 75 | 75 | — |

The coating with PVA to form the first layer was carried out with a 2, 3, 4, and 5% polymer solution. Molecular weight was 72,000, 76,000, 95,000, and 126,000. The degree of saponification was 96 percent for the molecular weight of 95,000, and 98 percent in all other instances. In part, 0.05 mole percent of maleic acid per mole of monomeric PVA was mixed into the polymer solution. The flow rate of the polymer solution in the hollow filaments was 0 to 350 mm/s, and the residence time 0.5 to 6.5 hours. Solvent volatilization proceeded according to the vacuum or carrier gas method. The first layer was free of defects starting at a layer thickness of about 1 um; maximum layer thickness was 80 um.

Pervaporation experiments were carried out with these bilayer membranes with a mixture of 80 weight percent ethanol and 20 weight percent water at temperatures in the range of 22° C. to 55° C. and a flow rate in the hollow filaments of 0.35 m/s. The flux rates achieved thereby were 0.016 to 5.4 L/m2.h; the separation factor (selectivity) alpha ranged from 130 to 1.1, respectively.

Increasing the polymer concentration in the solution produced higher separation factors with a minor decline in flux rates. Increasing the mixture temperature produced an appreciable (almost up to tenfold) increase in flux rate with no notable decline in the separation factor (selectivity) alpha.

The examples, moreover, show that it is possible with the novel process to adjust the thickness of the first layer over a broad range in a simple way.

The bilayer membranes produced according to the novel process are very suitable for the process disclosed in West German Patent Application Ser. No. P 35 36 007.0.

What is claimed is:

1. A process for the production of a bilayer membrane comprising a selectively acting nonporous polymer membrane first layer and a microporous membrane second layer comprising:
   (i) contacting an excess amount of a polymer solution with one surface of said microporous membrane second layer, said polymer solution comprising at least one polymer and a solvent for said polymer,
   (ii) volatilizing a portion of said solvent through the pores of said microporous layer as a vapor and without said polymer solution entering said pores, thereby forming said selectively acting non-porous polymer membrane layer on said surface of said microporous membrane second layer,
   (iii) removing the excess polymer solution after the desired thickness of said selectively acting non-porous polymer membrane layer is achieved,
wherein said microporous membrane second layer has a maximum pore size, and said polymer solution has a viscosity, which permit volatization of said solvent through the pores of said microporous membrane second layer.

2. The process of claim 1 wherein said selectively acting non-porous polymer membrane layer is subsequently dried after the excess polymer solution is removed.

3. The process of claim 1 wherein said selectively acting non-porous polymer membrane layer is subsequently cross-linked after the excess polymer solution is removed.

4. The process of claim 1 wherein said microporous membrane second layer is formed in the shape of at least one hollow filament or tube.

5. The process of claim 1 wherein said polymer is selected from the group consisting of cellulose acetate, polysulfone, polyvinyl alcohol, and polyacrylonitrile.

6. The process of claim 1 wherein said solvent is selected from the group consisting of dimethylsulfoxide and water.

7. The process of claim 1 wherein said microporous membrane second layer has a maximum pore size of about 1 micron.

8. The process of claim 1, wherein said polymer solution is caused to flow along said microporous membrane second layer.

9. The process of claim 2, wherein during the drying treatment a stream of gas is passed along said first layer.

10. The process of claim 3, wherein during the cross-linking treatment a stream of gas is passed along said first layer.

11. The process of claim 1, wherein said polymer solution has a polymer concentration in the range of from 1 to 7.5 weight percent.

* * * * *